May 13, 1930.   G. ZITZMANN   1,758,271
ENGINE TESTING GAUGE
Original Filed Feb. 8, 1926
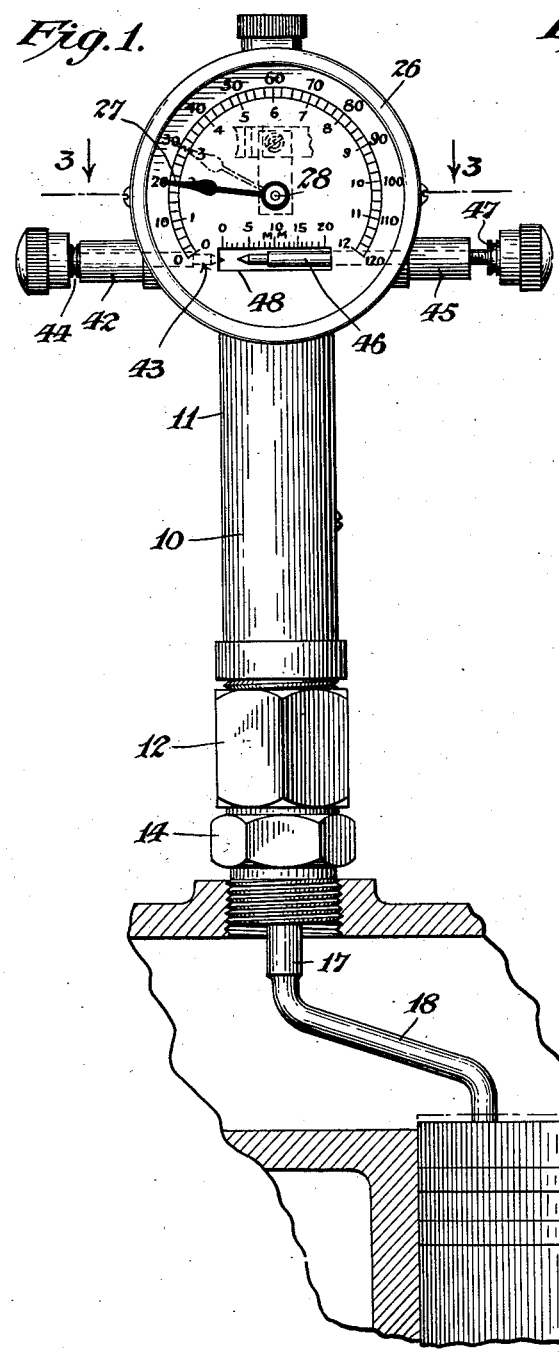
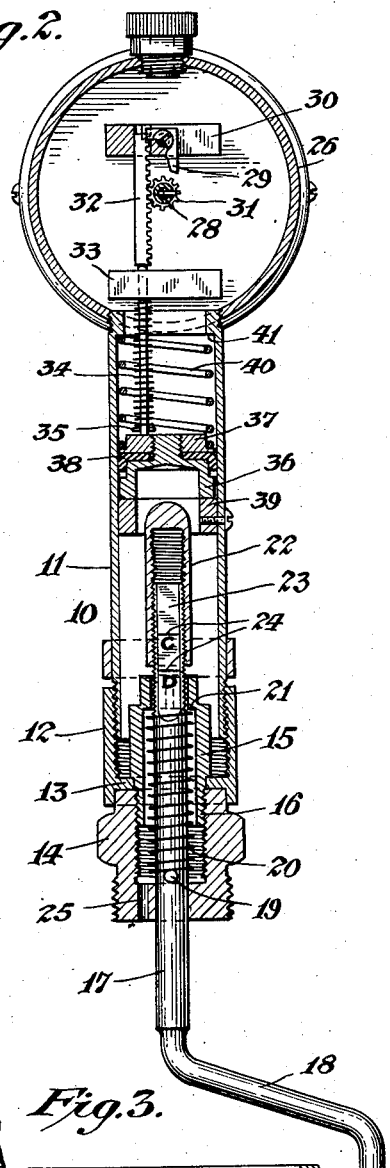

Patented May 13, 1930

1,758,271

UNITED STATES PATENT OFFICE

GEORGE ZITZMANN, OF YONKERS, NEW YORK, ASSIGNOR TO AUTOMATIC MOTOR CONTROL CORPORATION, OF NEW YORK, N. Y., A CORPORATION OF NEW YORK

ENGINE-TESTING GAUGE

Application filed February 8, 1926, Serial No. 86,764. Renewed July 17, 1928.

This invention relates to engine testing gauges, and has for its object the provision of a gauge that will accurately indicate compression conditions within the cylinder and that will also show the accuracy of the ignition timing.

The invention provides a simple and mechanic-proof instrument that is able to stand the hard wear and abuse of an automobile repair shop and that will give readings to within very close limits.

Other objects and advantages of the invention will become apparent as the description proceeds.

In the drawings,

Fig. 1 is an elevation of the gauge in its operative relation to an engine cylinder;

Fig. 2 is a longitudinal section through the gauge;

Fig. 3 is a cross-section on line 3—3 of Fig. 1, parts being broken away.

Referring more particularly to the drawings, the body of the instrument is a housing 10 composed of a main cylinder 11 to the lower end of which is threaded a nut 12 having an internal flange 13. A coupling 14 fits within the lower end of the nut and is clamped against the flange 13 by a sleeve 15 which has a shoulder engaging the upper part of the flange and a shank 16 threaded within the coupling 14.

A rod 17 is slidably mounted in the lower end of coupling 14 and has an off-set extension 18 to make contact with the top of the piston when the housing is inserted in a spark plug opening as shown in Fig. 1.

Within the coupling 14 the rod 17 carries a transverse pin 19 which acts as a lower abutment for a spring 20 surrounding the rod, the upper abutment for the spring being the shoulder 21 on the upper end of sleeve 15. The upper end of rod 17, which slidably passes through the end of sleeve 15, is threaded and provided with an adjustable cap 22. One side of rod 17 is flattened as shown at 23 and indicating marks 24 are placed on this flat surface. A hole 25 is made in the bottom of coupling 14.

The gauge housing 26 is secured to the upper end of cylinder 11 and carries the face plate with a scale inscribed thereon. Two readings cooperate with the scale, one within the scale and one outside the scale, both readings starting from zero at the left hand end of the scale. A pointer 27 cooperates with the scale and is carried by a shaft 28 journaled in a bracket 29 mounted on a block 30. A gear 31 is keyed to the shaft 28 and meshes with a rack bar 32 slidably mounted in block 30 and block 33. The lower end of rack bar 32 extends below block 33 and is surrounded by a spring 34 compressed between block 33 and a pin 35 in the lower end of bar 32.

A gas-tight piston, formed by the parts 36 and 37 clamping a washer 38 between them is inserted in the cylinder 11 and is limited in its movement by a stop ring 39 mounted in the cylinder. A compression spring 40 pressing against shoulder 41 on the cylinder normally holds the piston against the stop ring.

An insulating tube 42 is inserted in one side of gauge housing 26 and a spark point 43, provided with a grooved cable hook-on 44 is mounted in a stationary position within said tube. A second insulating tube 45 is mounted in the opposite side of the gauge housing and carries the spark point 46 which is mounted for longitudinal screw adjustment and carries a grooved cable hook-on 47. A window 48 is formed in the face plate so that the extent of the gap between the spark points can be visually determined.

In constructing the gauge the parts are so designed that a movement of .010 of an inch on the lower end of rod 17 will be magnified and move the pointer one full division of the inner readings, making it possible to check the position of the piston within very close limits.

The device is operated in the following manner:

The nut 12 is unscrewed from cylinder 11, and the lower part of the housing, which may be called the contact unit, is attached to the spark plug opening of a cylinder with the off-set arm 18 extending over the top of the piston as shown in Fig. 1. The cap 22 is normally screwed down against sleeve 15 to raise pin 19 from contact with the bottom of coupling 14.

The engine is now cranked by hand to see whether the piston at the upper part of its stroke is moving arm 18. If it is not, the cap 22 is unscrewed a few turns to lower the arm 18 so that the piston will give rod 17 a stroke of the length required to properly determine the point of ignition. The length of stroke required varies with different engines, but the shortest stroke that will cover all engines can be learned by short experience.

The above procedure is necessary when testing a car in which the relative position of the top limit of piston travel is unknown. When the device is to be used with a limited number of different cars, a suitably lettered graduation 24 can be provided for each car. In this case it would be necessary merely to set the cap 22 above the graduation for the car being tested. Once cap 22 has been properly adjusted the cylinder 11, or housing unit, is screwed into the nut 12 and the proper ignition wires are attached to the hook-ons 44 and 47. The motor is now cranked until the cylinder being tested reaches its compression stroke. As the piston ascends on the compression stroke the gas within the cylinder is compressed and flows through opening 25 and around rod 17 into contact with the piston 36, which is driven upwardly moving the pointer away from its zero position. The piston is stopped at the top of its stroke, at which time the maximum compression within the cylinder can be read off on the outer set of readings. By watching the action of the pointer at this time the condition of the cylinder can be determined. If the valves need grinding the compression is lost rapidly and the pointer drops back quickly, whereas if the valves are tight and the rings are worn the pointer moves back slowly. In either case the pointer drops back until the piston 36 contacts with cap 22, in which position the pointer indicates the top point of piston travel, as shown in dotted lines in Fig. 1.

The piston is now allowed to slowly descend on what would be the power stroke and the pointer is watched to check the accuracy of the ignition timing. In the average car the spark, when fully retarded, should occur when the piston is .040 in. below its top limit, or in the full line position of Fig. 1, the pointer in the meantime having moved to its full line position. If the ignition is accurately timed the spark will now jump across the spark gap, whereas if the spark occurs early or late that fact, as well as the extent of the error, can be ascertained by noting the position of the pointer at the time the spark occurs. The strength of the spark can also be determined by adjusting the length of the spark gap.

It is unimportant where the pointer stops in its dotted line position so long as it is far enough away from zero to allow a back reading from this dotted line position, indicating the top position of the piston, to its full line position, indicating the position of the piston at the point the spark occurs. Obviously the mechanic making the test must know the ignition point for the engine he is testing and read the gauge accordingly. This is easily done, since each division on the inner set of readings represents .010 in. of piston travel.

It will be evident that this invention provides a gauge by which both compression and ignition timing can be expeditiously tested on a single stroke of the engine. Both of these factors of engine efficiency are easily read on a single scale, over which the pointer moves from a common zero at one end of the scale.

What I claim is:

1. In an engine gauge, a housing adapted for attachment in an opening of an engine cylinder, indicating means carried by said housing, a rack bar within said housing and operatively connected with said indicating means and being the only operating member co-operating directly with the indicating means, and operating mechanism co-operating with said rack bar, said operating mechanism comprising pressure-actuated means mounted within the housing and engine-piston-actuatable means mounted within the housing.

2. In an engine gauge, a housing adapted for attachment in an opening of an engine cylinder, a graduated scale carried by said housing, a movable pointer co-operating with said scale, a vertically movable bar operatively connected with said pointer, said bar being permanently connected with said pointer and being the only operating member connected directly with said pointer, and operating means co-operating with said bar, said operating means comprising a pressure-actuated piston mounted within the housing and an engine-piston-actuatable member mounted within the housing.

In testimony whereof I affix my signature.

GEORGE ZITZMANN.